United States Patent
Cho et al.

(10) Patent No.: US 8,537,204 B2
(45) Date of Patent: *Sep. 17, 2013

(54) 3D TELEVISION BROADCASTING SYSTEM

(76) Inventors: Gyoung Il Cho, Seoul (KR); Tae Hyeon Kim, Taejeon (KR); Dong Woo Gim, Gyoungnam (KR); Cheong Soo Seo, Seoul (KR)

( * ) Notice: Subject to any disclaimer, the term of this patent is extended or adjusted under 35 U.S.C. 154(b) by 118 days.

This patent is subject to a terminal disclaimer.

(21) Appl. No.: 10/887,536

(22) Filed: Jul. 8, 2004

(65) Prior Publication Data

US 2006/0007301 A1    Jan. 12, 2006

(51) Int. Cl.
*H04N 13/00* (2006.01)
*H04N 15/00* (2006.01)

(52) U.S. Cl.
USPC .............................................. 348/51; 348/42

(58) Field of Classification Search
USPC ............ 348/51, 42, 559, 588, 589, 634, 725, 348/728, 484, 578, 580, 36, 155, 169, 50, 348/239, 47, 61, 584, 585, 600, 57, 52, 54, 348/55, 59, 461, 477, 478, 335, 345; 382/41, 382/17, 49; 359/619, 620, 626, 625, 665, 359/666, 667, 621, 622, 633
See application file for complete search history.

(56) References Cited

U.S. PATENT DOCUMENTS

| | | | |
|---|---|---|---|
| 2,002,376 A | 5/1935 | Mannheimer | |
| 4,132,468 A | 1/1979 | Lo et al. | |
| 4,214,257 A | 7/1980 | Yamauchi | |
| 4,407,567 A | 10/1983 | Michelet | |
| 4,661,986 A | * 4/1987 | Adelson | 382/154 |
| 4,717,949 A | 1/1988 | Eichenlaub | |
| 4,731,864 A | * 3/1988 | Modla | 382/255 |
| 4,834,512 A | 5/1989 | Austin | |
| 4,945,407 A | 7/1990 | Winnek | |
| 5,004,319 A | 4/1991 | Smither | |
| 5,212,555 A | 5/1993 | Stoltz | |
| 5,264,964 A | 11/1993 | Faris | |
| 5,369,433 A | 11/1994 | Baldwin | |

(Continued)

FOREIGN PATENT DOCUMENTS

| | | |
|---|---|---|
| JP | 08-043881 | 2/1996 |
| JP | 11-069209 | 3/1999 |
| JP | 2002-288873 | 10/2002 |

OTHER PUBLICATIONS

James G. Boyd IV and Gyoungil Cho, "Fast-response Variable Focusing Micromirror Array Lens," Proc. SPIE, vol. 5055, pp. 278-286 (2003).

*Primary Examiner* — Behrooz Senfi (57) ABSTRACT

Television broadcasting systems of this invention comprise an imaging system, and transmission system, and a displaying system. The imaging system captures two-dimensional images of an object at different focal plane, and generates an all-in-focused image and depth profile. A data signal carrying the image data is generated and transmitted over a broadcasting system compatible with commercial two-dimensional television broadcasting, cable, and/or alternative systems. The depth profile is transmitted by using vacant space in video/audio signal within the allocated channel bandwidth. The data signal is received by the displaying system and the extracts the all-in-focused image and depth information from the data signal. The object is restored from all-in-focused image and depth profile and displayed on the displaying system as a three-dimensional spatial image. Viewers having conventional two-dimensional display device can watch enhanced two-dimensional images.

31 Claims, 10 Drawing Sheets

(56) References Cited

U.S. PATENT DOCUMENTS

| | | | | |
|---|---|---|---|---|
| 5,402,407 | A | 3/1995 | Eguchi et al. | |
| 5,467,121 | A | 11/1995 | Allcock | |
| 5,612,736 | A | 3/1997 | Vogeley et al. | |
| 5,661,518 | A * | 8/1997 | Palm et al. | 348/42 |
| 5,696,619 | A | 12/1997 | Knipe | |
| 5,748,199 | A * | 5/1998 | Palm | 345/473 |
| 5,881,034 | A | 3/1999 | Mano | |
| 5,897,195 | A | 4/1999 | Choate | |
| 5,986,811 | A * | 11/1999 | Wohlstadter | 359/626 |
| 6,025,951 | A | 2/2000 | Swart | |
| 6,028,689 | A | 2/2000 | Michaliek | |
| 6,046,849 | A | 4/2000 | Moseley et al. | |
| 6,055,013 | A | 4/2000 | Woodgate et al. | |
| 6,055,330 | A * | 4/2000 | Eleftheriadis et al. | 382/154 |
| 6,064,423 | A | 5/2000 | Geng | |
| 6,084,843 | A | 7/2000 | Abe | |
| 6,104,425 | A | 8/2000 | Kanno | |
| 6,111,900 | A | 8/2000 | Suzudo | |
| 6,123,985 | A | 9/2000 | Robinson | |
| 6,282,213 | B1 | 8/2001 | Gutin | |
| 6,315,423 | B1 | 11/2001 | Yu | |
| 6,329,737 | B1 | 12/2001 | Jerman | |
| 6,498,673 | B1 | 12/2002 | Frigo | |
| 6,507,366 | B1 | 1/2003 | Lee | |
| 6,549,730 | B1 | 4/2003 | Hamada | |
| 6,625,342 | B2 | 9/2003 | Staple et al. | |
| 6,649,852 | B2 | 11/2003 | Chason et al. | |
| 6,650,461 | B2 | 11/2003 | Atobe et al. | |
| 6,658,208 | B2 | 12/2003 | Watanabe et al. | |
| 6,690,428 | B1 * | 2/2004 | Hudelson et al. | 348/461 |
| 6,711,319 | B2 | 3/2004 | Hoen | |
| 6,741,384 | B1 | 5/2004 | Martin | |
| 6,784,771 | B1 | 8/2004 | Fan | |
| 6,833,938 | B2 | 12/2004 | Nishioka | |
| 6,885,819 | B2 | 4/2005 | Shinohara | |
| 6,900,901 | B2 | 5/2005 | Harada | |
| 6,900,922 | B2 | 5/2005 | Aubuchon | |
| 6,906,848 | B2 | 6/2005 | Aubuchon | |
| 6,906,849 | B1 | 6/2005 | Mi | |
| 6,914,712 | B2 | 7/2005 | Kurosawa | |
| 6,919,982 | B2 | 7/2005 | Nimura et al. | |
| 6,934,072 | B1 | 8/2005 | Kim | |
| 6,934,073 | B1 | 8/2005 | Kim | |
| 6,958,777 | B1 | 10/2005 | Pine | |
| 6,970,284 | B1 | 11/2005 | Kim | |
| 6,995,909 | B1 | 2/2006 | Hayashi et al. | |
| 6,999,226 | B2 | 2/2006 | Kim et al. | |
| 7,023,466 | B2 | 4/2006 | Favalora et al. | |
| 7,031,046 | B2 | 4/2006 | Kim et al. | |
| 7,046,447 | B2 | 5/2006 | Raber | |
| 7,068,416 | B2 * | 6/2006 | Gim et al. | 359/291 |
| 7,077,523 | B2 | 7/2006 | Seo et al. | |
| 7,161,729 | B2 | 1/2007 | Kim et al. | |
| 7,261,417 | B2 * | 8/2007 | Cho et al. | 353/10 |
| 7,350,922 | B2 * | 4/2008 | Seo et al. | 353/10 |
| 2002/0018407 | A1 | 2/2002 | Komoto | |
| 2002/0102102 | A1 | 8/2002 | Watanabe | |
| 2002/0135673 | A1 | 9/2002 | Favalora | |
| 2003/0058520 | A1 | 3/2003 | Yu | |
| 2003/0071125 | A1 | 4/2003 | Yoo | |
| 2003/0174234 | A1 | 9/2003 | Kondo | |
| 2003/0184843 | A1 | 10/2003 | Moon | |
| 2004/0009683 | A1 | 1/2004 | Hiraoka | |
| 2004/0012460 | A1 | 1/2004 | Cho | |
| 2004/0021802 | A1 | 2/2004 | Yoshino | |
| 2004/0052180 | A1 | 3/2004 | Hong | |
| 2004/0246362 | A1 | 12/2004 | Konno | |
| 2004/0252958 | A1 | 12/2004 | Abu-Ageel | |
| 2005/0024736 | A1 | 2/2005 | Bakin | |
| 2005/0057812 | A1 | 3/2005 | Raber | |
| 2005/0136663 | A1 | 6/2005 | Terence Gan et al. | |
| 2005/0174625 | A1 | 8/2005 | Huiber | |
| 2005/0180019 | A1 | 8/2005 | Cho | |
| 2005/0212856 | A1 | 9/2005 | Temple | |
| 2005/0224695 | A1 | 10/2005 | Mushika | |
| 2005/0225884 | A1 | 10/2005 | Gim | |
| 2005/0231792 | A1 | 10/2005 | Alain | |
| 2005/0264870 | A1 | 12/2005 | Kim | |
| 2006/0012766 | A1 | 1/2006 | Klosner | |
| 2006/0012852 | A1 | 1/2006 | Cho | |
| 2006/0028709 | A1 | 2/2006 | Cho | |
| 2006/0187524 | A1 | 8/2006 | Sandstrom | |
| 2006/0209088 | A1 * | 9/2006 | Gibbs et al. | 345/629 |
| 2006/0209439 | A1 * | 9/2006 | Cho et al. | 359/851 |
| 2006/0221179 | A1 * | 10/2006 | Seo et al. | 348/46 |

* cited by examiner

3D TELEVISION BROADCASTING SYSTEM

FIELD OF THE INVENTION

The present invention relates generally to a television broadcasting system and, more specifically, to a television broadcasting system capable of broadcasting three-dimensional images.

BACKGROUND

There are several three-dimensional display techniques known in the art. These techniques include: the "lenticular" technique, described in U.S. Pat. Nos. 4,945,407, 4,214,257, and 4,132,468; the "parallax barrier" technique, described in U.S. Pat. Nos. 6,046,849, 6,055,013, 5,264,964, and 4,717,949; integral imaging, described in U.S. Pat. Nos. 6,046,849, 6,055,013, 5,264,964, and 4,717,949; and holographic display. However, these existing technologies have serious problems that have not been solved and these existing technologies are not likely to be applied to broadcasting systems in the near future.

Three-dimensional television broadcasting systems using existing three-dimensional display devices demand new three-dimensional television broadcasting methods and systems. New methods and systems are necessary because the image acquisition, data format, and/or the display device for the three-dimensional broadcasting of existing three-dimensional display arts are systematically different from those of commercial two-dimensional television broadcasting standards and systems. In that regard, the data signal for three-dimensional television broadcasting should be released separately from the data signal for two-dimensional commercial television broadcasting. Further, existing three-dimensional television broadcasting systems induce a big increase in image data and/or degradation in the image quality and resolution, due to their primitively existing disadvantages and complexity.

There is, therefore, a practical need for a commercial three-dimensional television broadcasting system which can meet the requirements related to 2D/3D compatibility or exchangeability, and practicality. Further, this system should not require a significant increase in data amount, and the color expression and resolution should equal existing commercial two-dimensional television broadcasting standards and systems.

SUMMARY OF THE INVENTION

The present invention is directed to a television broadcasting system that broadcasts objects as three-dimensional images. Broadcasting systems of this invention comprise an imaging system, an audio/video transmission system, and a display system.

The imaging system comprises an imaging device and an imaging processor. The imaging device captures a set of two-dimensional image frames of an object at various focal planes. The imaging processor extracts in-focused pixels and depth information from each of the frames, and generates a two-dimensional all-in-focused image and a depth profile within the afterimage time of the human eye.

The transmission system generates a data signal carrying the image data that is transmitted over a commercial two-dimensional television broadcasting system, cable system, or any alternative. Since the image data of present invention has the same format as conventional two-dimensional image data, the depth information of each pixel of the two-dimensional all-in-focused image is transmitted using the vacant space in the video and/or audio signal data of the conventional two-dimensional broadcasting system. Thus, the conventional two-dimensional transmission system can be used for transmitting the three-dimensional image data with little or no modification.

The displaying system comprises a three-dimensional display device that receives the image data and restores the object images as a three-dimensional spatial object. Viewers who only have a conventional two-dimensional display device, such as a conventional TV set, monitor or digital display, can watch the all-in-focused two-dimensional images using their device. In this case, the depth profile does not play any role in displaying images. Even though they can not watch three-dimensional images, viewers can watch enhanced two-dimensional all-in-focused image.

The invention is also directed to a method for broadcasting three-dimensional images. The method comprises capturing a set of two-dimensional image frames of an object with an imaging system, processing the set of two-dimensional image frames to generate corresponding three-dimensional image data, and transmitting a data signal carrying the three-dimensional image data over a television broadcasting system. The image data is then received by a displaying system, extracted and restored in the displaying system, and the object is broadcasted on the displaying system as a three-dimensional spatial image.

In conclusion, the advantages provided by the present invention over broadcasting systems of the prior art, are as follows:

(1) The invention is fully compatible with conventional two-dimensional television broadcasting systems and/or conventional alternatives;

(2) The invention provides an easy and cost effective way of constructing three-dimensional television broadcasting systems and/or alternatives for generating, transmitting, and displaying three-dimensional images;

(3) Viewers can watch qualitatively enhanced two-dimensional images even with their two-dimensional display device, such as a conventional TV set; and (4) Rearrangement and/or reallocation of the radio frequency channel spacing is not required for three-dimensional broadcasting since the image data of the invented system is very similar size to that of conventional two-dimensional television broadcasting systems, and they can be transmitted by using the vacant space in the transmitted video and/or audio signals.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION

Figure 1:
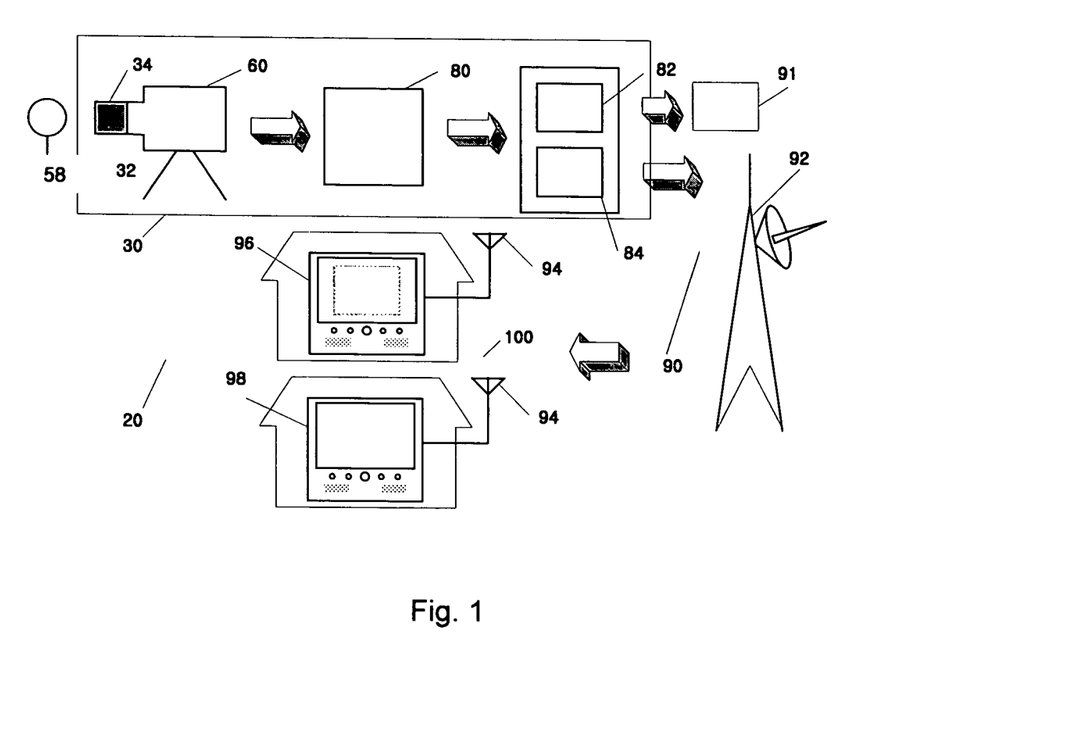
FIG. 1 is a schematic view of a three-dimensional broadcasting system in accordance with the present invention.

In a particularly preferred embodiment of the invention there is provided a three-dimensional television broadcasting system that transmits three-dimensional images from an imaging device to an image display. The three-dimensional broadcasting system is fully compatible with conventional commercial two-dimensional television broadcasting and cable systems. As shown in FIG. 1, the three-dimensional broadcasting system 20 comprises an imaging system 30, a transmission system 90, and a displaying system 100.

Figure 2:
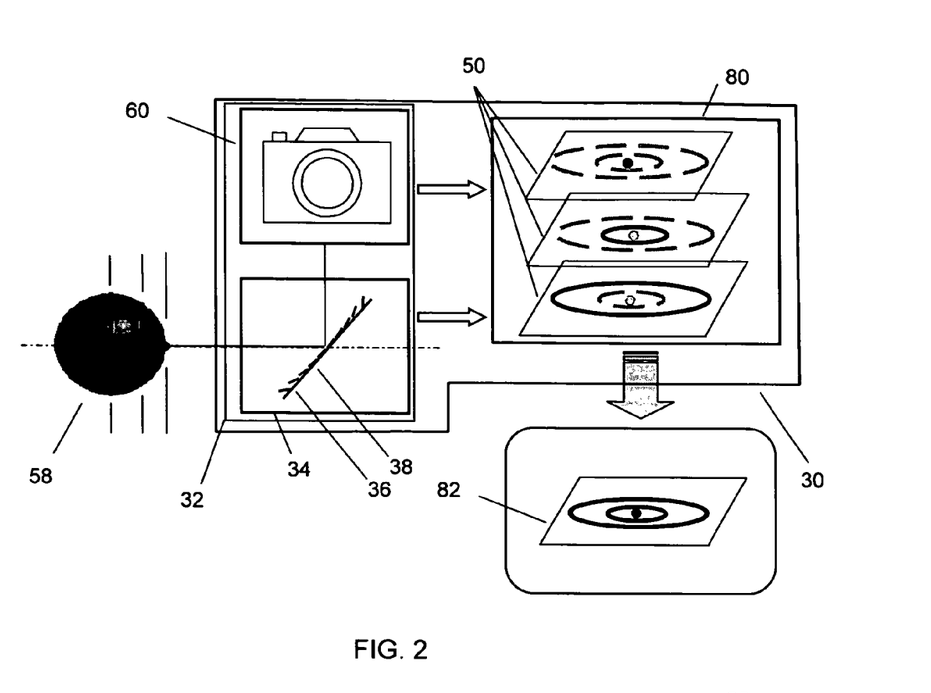
FIG. 2 is a schematic view of an imaging system in accordance with the present invention.

Turning now to FIG. 2, the three-dimensional imaging system 30 comprises an imaging device 32 and an image processor 80. Such a system is described in co-pending U.S. patent application Ser. No. 10/822,414, entitled "Three-Dimensional Imaging Device", the disclosure of which is hereby incorporated by reference as if set forth in full herein. The imaging device and the image processor may be packaged within the same apparatus or packaged separately.

The imaging device 32 includes a variable focusing system 34 and an imaging unit 60. The variable focusing system 34 comprises a variable focal length lens 36. The variable focal length lens is preferably a micromirror array lens 38. Such a micromirror array lens was proposed by James G. Boyd IV and Gyoungil Cho in their paper entitled, "Fast-response Variable Focusing Micromirror Array Lens", *Proc. SPIE*, Vol. 5055, pp. 278-286 (2003). The paper is incorporated by reference into this disclosure as if fully set forth herein.

Figure 5:
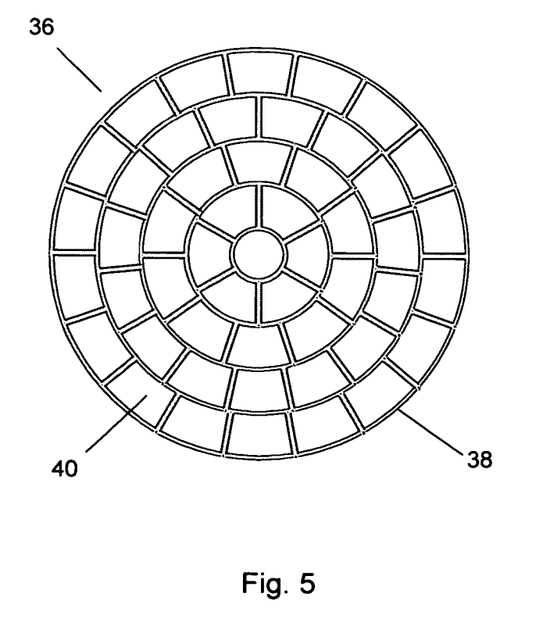
FIG. 5 is a top view of the micromirror array lens of FIG. 4.

As shown in FIG. 5, the micromirror array lens 38 comprises a plurality of micromirrors 40 concentrically arranged in a plane to form one or more concentric circles. The micromirrors 40 are individually controlled electrostatically and/or electromagnetically by actuating components. Each micromirror comprises a reflective surface preferably made of metal. It is presently preferred that the reflective surface of the micromirrors comprise a slight curvature, and the profile of the micromirrors comprise a fan shape to increase the effective reflective area of the micromirror array lens. This increases the optical efficiency of the lens.

In another embodiment, the reflective surface of the micromirrors 40 may be flat.

The mechanical structures upholding the micromirrors 40 and the actuating components that rotate and translate the micromirrors are located under the micromirrors to enable the micromirrors to be positioned closer to one another. This also increases the effective reflective area of the micromirror array lens. Since the micromirrors are small in mass and generate small moments of inertia, their positions and attitudes may be changed at a rapid rate.

Figure 4:
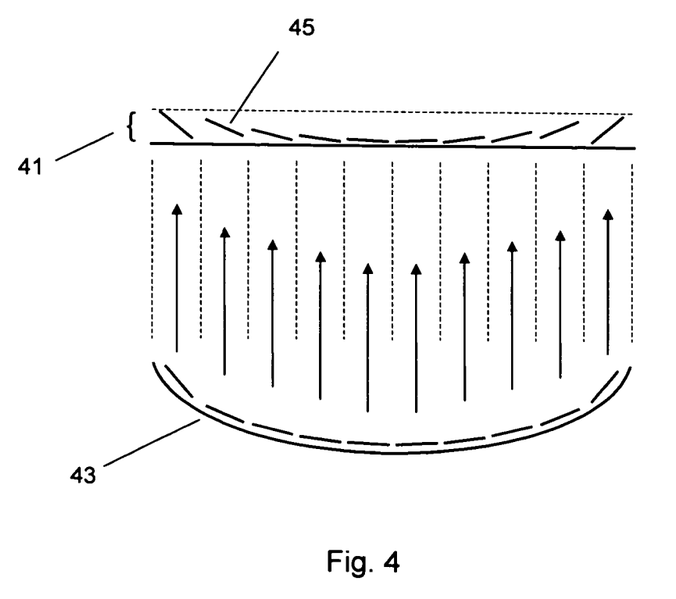
FIG. 4 is a schematic view illustrating the principal of a micromirror array lens in accordance with the present invention.

FIG. 4 illustrates the principle of a micromirror array lens 41. In theory, there are two conditions for a perfect lens. The first is a converging condition, where all of the light scattered by one point of an object should converge into one point on an image plane. The second is the same phase condition, where all of the converging light should have the same phase along an image plane. To satisfy the perfect lens conditions, the surface shape of a conventional reflective lens 43 is generated to: (1) have all light scattered from one point of an object converge into one point on an image plane; and (2) have the optical path length of all the converging light to be same. Even though the optical path length of the converging light is different, the same phase condition can be satisfied because a phase of light is periodic. Therefore, the surface shape of the conventional reflective lens 43 satisfying perfect lens conditions can be replaced by rotating and translating micromirrors 45 of the micromirror array lens 41. In that regard, each micromirror 45 may be rotated to converge the scattered light, and translated to adjust the phase.

Figure 6:
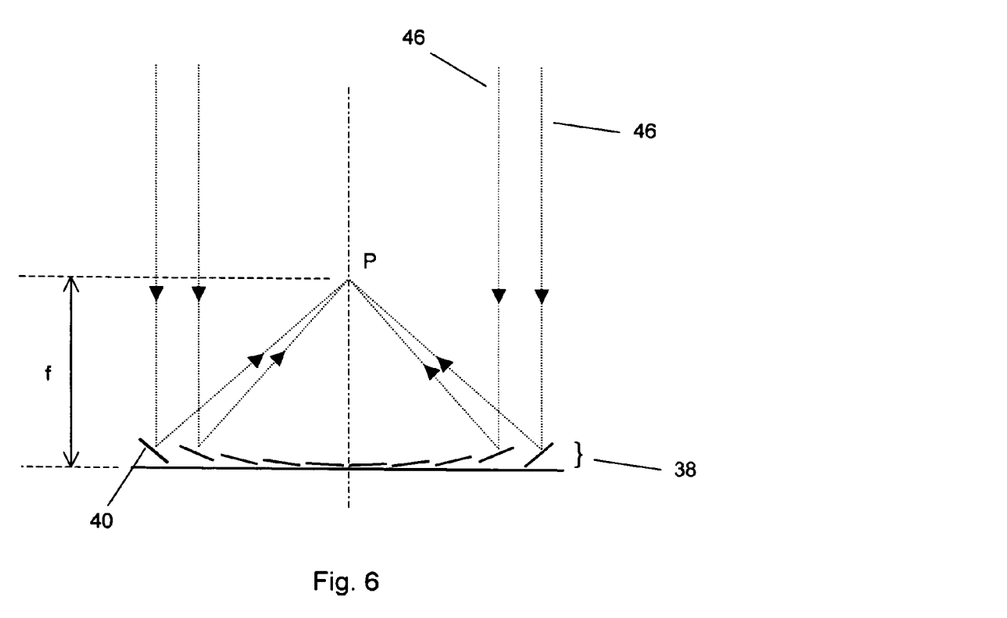
FIG. 6 is a schematic side view illustrating how the focal length of the micromirror array lens of FIG. 4 is changed according to the principles of the invention.

FIG. 6 illustrates how the micromirror array lens 38 gets an image. Accordingly, arbitrarily scattered light 46 is converged into one point P on an image plane by controlling the position of the micromirrors 40. The phases of the arbitrary light 46 may be adjusted to be the same by translating each one of the micromirrors 40. The required translational displacement of the micromirrors is at least half of the wavelength of light.

The focal length f of the micromirror array lens 38 is changed by controlling the rotation and/or translation of the micromirror 40. The operation of the micromirror array lens is possible by controlling only the rotation of the micromirrors without controlling their translation, even though the lens can not satisfy the phase condition. In this instance, the imaging quality of the lens 38 generated by controlling only the rotation of the micromirrors is degraded by the aberration.

Pure translation of the micromirrors without rotation can satisfy the two imaging conditions by Fresnel diffraction theory. The lens generated by controlling only the translation of the micromirrors has the aberration too. The smaller the size of the micromirrors 40, the lesser the aberration. Even though the quality of the lens with one motion is lower than the lens with rotation and translation, the lens with one motion has the advantage that its control and fabrication is easier than the lens with both rotation and translation.

As discussed above, it is desired that each micromirror 40 have a curvature because the ideal shape of a conventional reflective lens has a curvature. However, since the aberration of the micromirror array lens with flat micromirrors is not much different from a conventional lens with curvature if the size of the micromirrors are small enough, there is not much need to control the curvature of the micromirrors.

Figure 7:
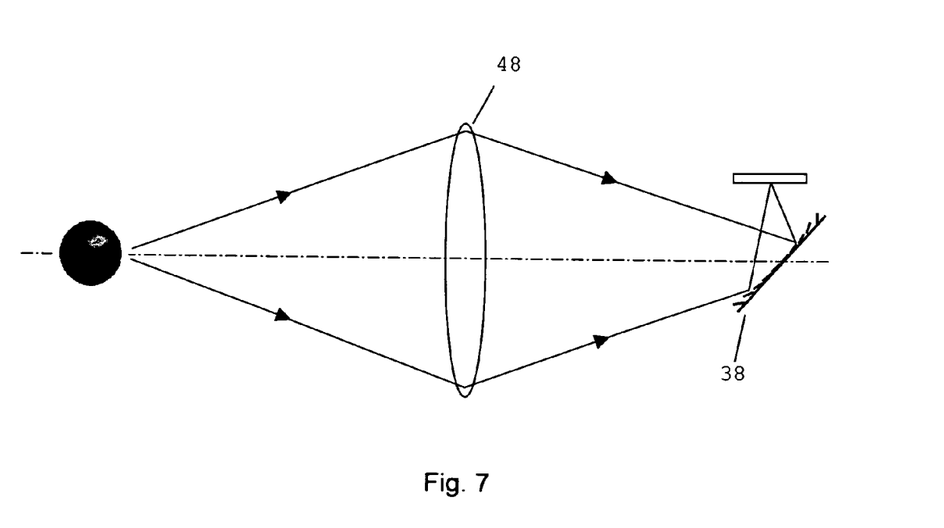
FIG. 7 is a schematic side view of a second alternative imaging system in accordance with the present invention.

As shown in FIG. 7, an effective focal length and numerical aperture of the three-dimensional imaging device 32 can be extended or changed by an auxiliary lens 48 having a predetermined focal length. An auxiliary lens with a large numerical aperture can increase the numerical aperture of the three-dimensional imaging system. Also, the effective focal length of the three-dimensional imaging system can be changed to a desired range by using the auxiliary lens 48 in combination with the micromirror array lens 38.

The micromirror array lens is an adaptive optical component because the phase of light can be changed by the translations and/or rotations of micromirrors. As such, the micromirror array lens can correct the phase errors of light introduced by the medium between the object and its image, and/or correct the defects of a lens system that cause its image to deviate from the rules of paraxial imagery.

For an example, the micromirror array lens can correct the phase error caused by optical tilt by adjusting the translations and/or rotations of micromirrors. This allows magnification of any object within the Field of View without macroscopic mechanical motion of some portion of the optical system. Thus, the object to be magnified does not have to lie on the optical axis, as required in a conventional system.

The same phase condition is satisfied by the micromirror array lens using an assumption of monochromatic light. Therefore, to get a color image, the micromirror array lens of the three-dimensional imaging system is controlled to satisfy the same phase condition for each wavelength of Red, Green, and Blue (RGB), respectively, and the three-dimensional imaging system can use bandpass filters to make monochromatic lights with wavelength of Red, Green, and Blue (RGB).

Referring back to FIG. 2, the imaging unit 60 includes one or more two-dimensional image sensors. The image unit captures original two-dimensional images 50 at different focal planes and communicates such image data to the imaging processing unit 80. The imaging unit is very similar to the conventional broadcasting cameras except that it requires a faster and more sensitive image sensor or sensors. For example, an imaging unit in accordance with the present invention has an imaging speed greater than or equal to the product of the afterimage speed of the human eye and the number of two-dimensional depthwise image frames in an all-in-focused image.

The image processing unit 80 is preferably a computer processing unit (cpu) that extracts in-focused pixels and depth information, and generates a two-dimensional all-in-focus image 82 and depth profile 84 (see FIG. 1), from the original two-dimensional images.

The image data is preferably processed within a unit time of less than or equal to the afterimage time of the human eye. Several algorithms may be applied to construct the all-in-focused images and depth profile, including but not limited to, the sharpness comparison—between pixels on the depthwise 2D image—method, and the one pixel method.

The image data may be stored in conventional data formats, such as disks, tape, or DVDs, and has the same data size as conventional two-dimensional broadcasting images. The all-in-focused image and depth profile can also be created from computer generated images.

Figure 8A:
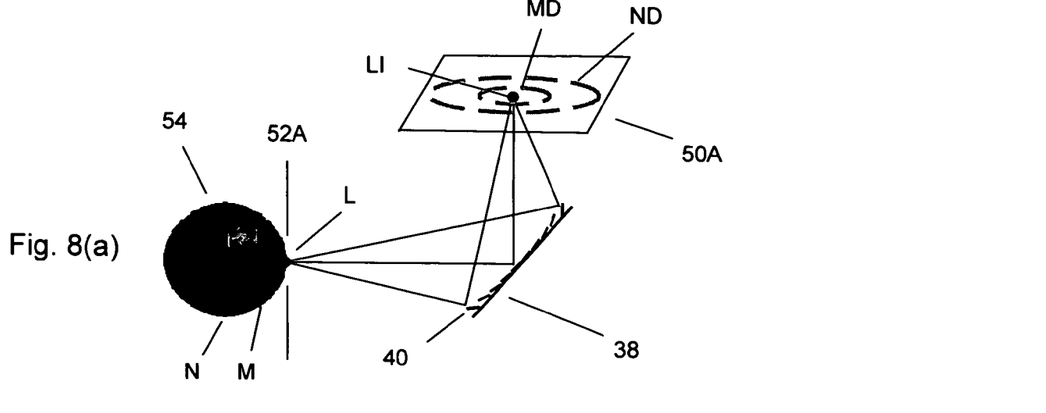
FIGS. 8(a)-8(c) are schematic side views illustrating how the imaging system of FIG. 1 captures original two-dimensional images and corresponding depth information according to principles of the present invention.
Figure 8B:
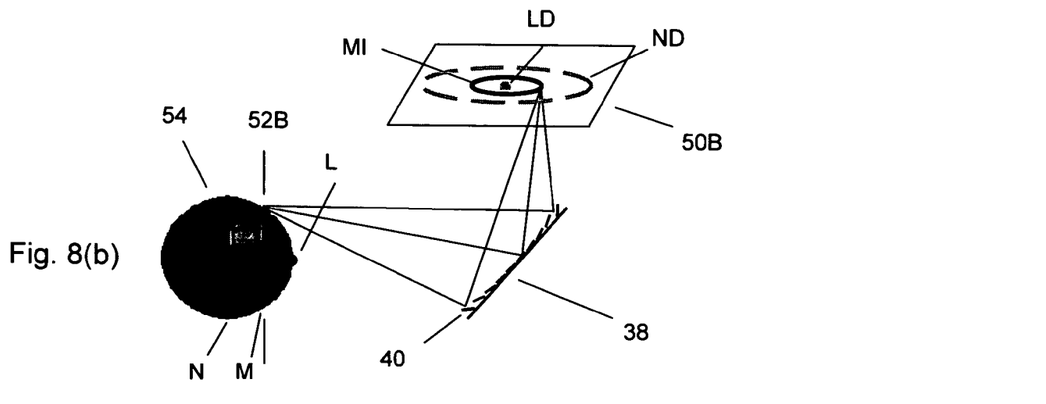
Figure 8C:
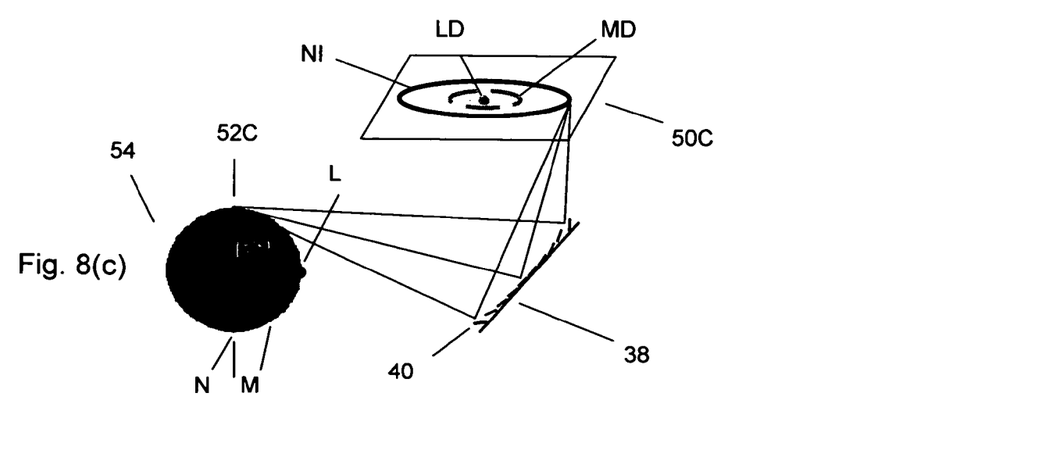

With reference to FIG. 8(a)-8(c), the micromirror array lens 38 captures original two-dimensional image frames 50A, 50B, and 50C with corresponding focal planes 52A, 52B, and 52C. The focal length of the micromirror array lens 38 is changed by electrostatically and/or electromagnetically controlling each of the micromirrors 40. Changing the focal length of the micromirror array lens changes the focal plane of the imaging system 30. The two-dimensional original images 50A, 50B, and 50C are taken with their corresponding depth information, which is obtained from the position of the focal plane.

In that regard, the original two-dimensional image 50A, with the first focal plane 52A, has an in-focus image LI. In-focus image LI is the image of portion L of an object 54. Images MD and ND of portions H and N of the object 54, are defocused. Accordingly, the image processing unit 80 determines the in-focus pixels LI from the original two-dimensional image 50A. The position of the focal plane 52A of the first original two-dimensional image 50A—relative to the micromirror array lens 38—provides the depth information of in-focus pixels LI. The original two-dimensional images 50B and 50C, with the second and third focal plane 52B and 52C, are processed in the same manner as the first focal plane to get in-focus images and depth information of those in-focus images.

Accordingly, when the micromirror array lens 38 changes the focal length according to the predetermined desired depths, the image sensor 60 takes original two-dimensional images 50, with the corresponding depth information. The desired number of depths is determined by the depth resolution and the range of depth of the object to be imaged.

To capture real time three-dimensional video images, the desired focal planes are scanned within the unit time. Even though the unit time is not important for still images, the unit time must be less than the afterimage speed of the human eye for real-time three-dimensional video imagery. The necessary focal length change speed of the micromirror array lens equals the product of the desired number of focal planes and the afterimage speed of the human eye. The necessary speed of the image processing is equal to or lager than the speed of micromirror array lens to do real-time three-dimensional imaging.

Once the all-in-focus image and depth information for each pixel of the image is processed, the image data is stored in the processing unit 80.

If a color photoelectric sensor is used as an image sensor in the three-dimensional imaging system using a micromirror array lens, a color image can be obtained by processing electrical signals from Red, Green, and Blue (RGB) sensors with or without bandpass filters, which should be synchronized with the control of micromirror array lens.

To image the Red light scattered from an object, the micromirror array lens is controlled to satisfy the phase condition for the Red light. Red, Green, and Blue image sensors measure the intensity of each Red, Green, and Blue light scattered from an object. Among them, only the intensity of Red light is stored as image data because only Red light is imaged properly. To image each Green and Blue light, the micromirror array lens and each imaging sensor works in the same manner with the process of the Red light. Therefore, the micromirror array lens is synchronized with Red, Green, and Blue imaging sensors.

Figure 3:
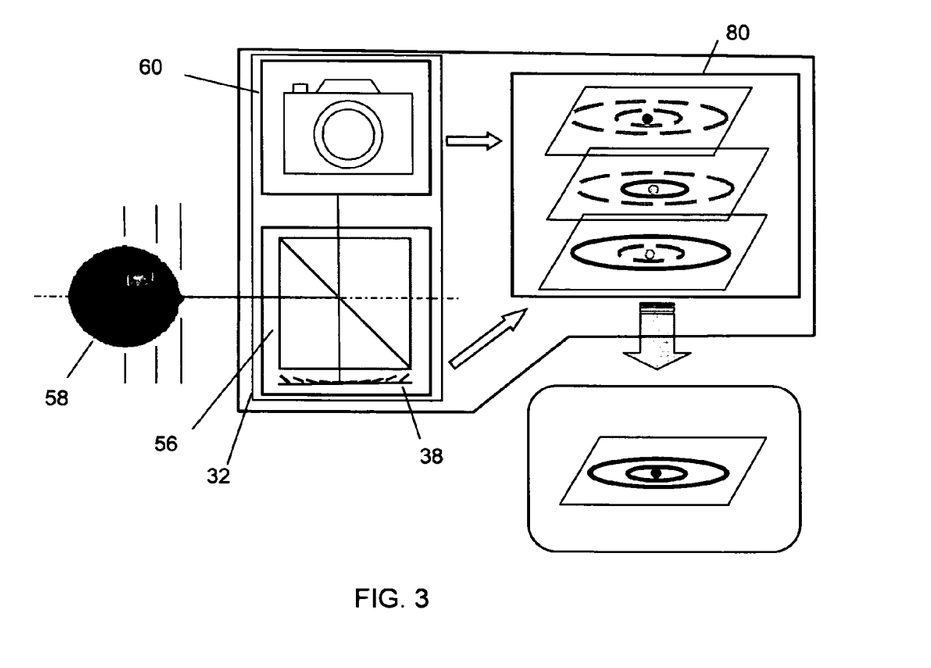
FIG. 3 is a schematic view of alternative imaging system in accordance with the present invention.

In another embodiment, as shown in FIG. 3, the three-dimensional imaging device 32 further includes a beam splitter 56 positioned in the path of light between the micromirror array lens 38 and the image unit, or sensor 60. Since the micromirror array lens is a reflective type, the components of the imaging device cannot be arranged in-line. This embodiment requires an optical arrangement in which the reflected light is not blocked by the object 58. The beam splitter 56 changes the direction of the light by 90°, and thus the micromirror array lens 38 is positioned orthogonal to the light path.

Alternatively, as shown in FIG. 2, the micromirror array lens 38 may be positioned so that the path of the light reflected by the micromirror array lens is not blocked without using a beam splitter.

In yet another embodiment, the micromirror array lens may be used as a zoom element of the imaging unit, or camera. In one instance, two or more micromirror array lenses may be used to construct a zooming system with or without conventional lenses. In another instance, one micromirror array lens may be utilized in a conventional zooming system for cameras to construct a variable focusing camera.

With reference to FIG. 1, the transmission system comprises a transmitter 91, a transmission medium 92, and a receiver 94. The transmitter is coupled to the image processing unit 80. The transmitter retrieves the all-in-focus image 82 and depth profile 84 from the image processing unit and generates an analog or digital video and/or audio data signal carrying the image data.

The transmission medium 92 transmits the data signal generated by the transmitter 91, to the receiver 94. It is presently preferred that the transmission medium 92 comprise a commercial two-dimensional television broadcasting system, cable system, or any suitable alternative. As such, the transmission medium's technical format is preferably 525 lines per frame with roughly 30 fps (frames per second) refresh rate.

The receiver 94 is coupled to the displaying system 100. The receiver receives the data signal from the transmission medium 92 and communicates the signal to the displaying system.

Figure 9:
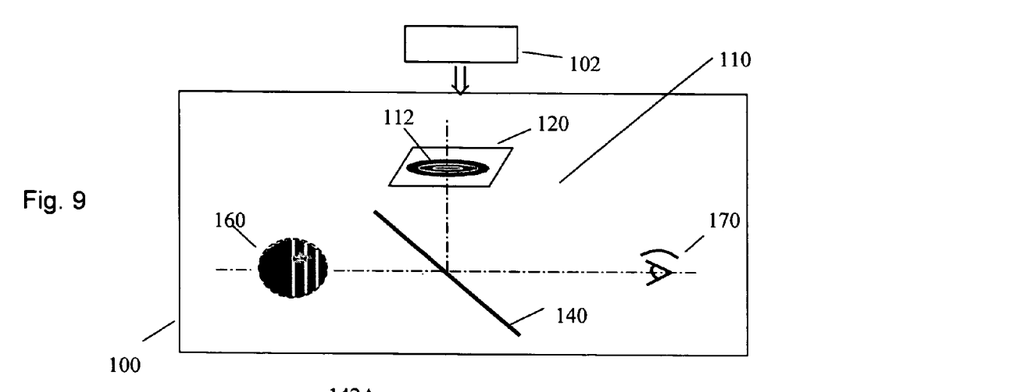
FIG. 9 is a schematic side view of a three-dimensional display system in accordance with the present invention.

Referring to FIG. 9, the displaying system 100 comprises a signal processor 102 and a three-dimensional display device (3D device) 110. The signal processor receives the data signal from the receiver 94 and extracts, or restores the all-in-focused image and depth profile of the object. The all-in-focused image is then communicated to the internal 2D display of the 3D device 110. The depth profile is communicated to the focusing lens of the 3D device 110.

The 3D device 110 includes a two-dimensional display (2D display) 120, and a variable focusing lens 140. Such a device is described in co-pending U.S. patent application Ser. No. 10/778,281, entitled "Three-Dimensional Display using Variable Focusing Lens", the disclosure of which is hereby incorporated by reference as if set forth in full herein. The 2D display displays a first image 112, received from the signal processor 102. The variable focusing lens receives light from the 2D display and forms a second image 160. The variable focusing lens 140 changes its focal length, in accordance with the depth profile communicated from the signal processor, so that the second image appears three-dimensional to a viewer 170.

The 2D display 120 preferably comprises a conventional TV set, monitor or display.

Figure 13:
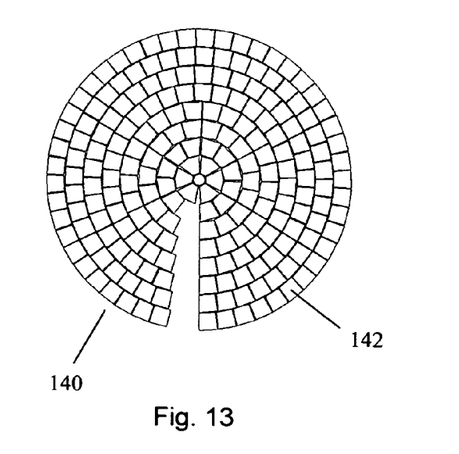
FIG. 13 is a top view of a micromirror array lens comprised within the three-dimensional display system of FIG. 9.

Referring now to FIG. 13, the variable focusing lens 140 comprises a micromirror array lens. The micromirror array lens 140 is synchronized with the 2D display 120 to display second depthwise images 144A, 144B, and 144C according to the depths of first depthwise images 142A, 142B, and 142C. Namely, the focal length of the micromirror array lens is synchronized with the depths of the first depthwise images 142A, 142B, and 142C, and continuously changes. The synchronization of the micromirror array lens with the first depthwise images enable the second image 160, consisting of the second depthwise images 144A, 144B, and 144C, which have continuous depths, to be displayed realistically. The focal length change speed of the micromirror array lens, and the display speed of the 2D display 120 must be equal to or greater than the product of the afterimage speed of the human eye, which is about 30 Hz, and the number of depths of the depthwise images. For example, if the image has 5 depths, the focal length change speed of the micromirror array lens should be greater than or equal to 150 Hz.

Figures 11A, 11B, 11C, 12A, 12B, 12C:
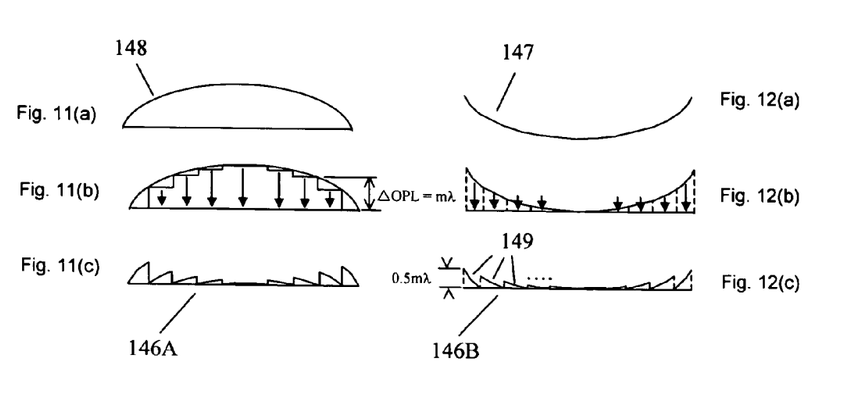
FIGS. 11(a)-11(c) are cross-sectional side views illustrating how a refractive Frensel lens replaces an ordinary single-bodied lens.
FIGS. 12(a)-12(c) are cross-sectional side views illustrating how a reflective Frensel lens is formed with a micromirror array lens.

FIGS. 11(a)-11(c) illustrates how a refractive Fresnel lens 146A replaces an ordinary single-bodied lens 148, and FIGS. 12(a)-12(c) illustrates how a reflective Fresnel lens 146B, replacing an ordinary single-bodied mirror 147, is formed with a micromirror array lens 140. The micromirror array lens includes a plurality of micromirrors 149 that are controlled to form a reflective Fresnel lens 146B, and change the focal length of the variable focusing lens 140.

In order to obtain a bright and sharp image, all of the rays leaving one point of an object must converge with the same phase onto one point on an image plane. Therefore, the roles of a lens are to converge the rays scattered by an object, and make each ray have the same optical path length (OPL). Alternatively, imaging using a Fresnel lens can be achieved by giving each ray the same periodical phase, even though the rays have different OPLs. This is achieved by adjusting the OPL difference to be integer multiples of the wavelength, $\lambda$. Each facet converges rays to one point, and the rays refracted or reflected by different facets have an OPL difference of integer multiples of $\lambda$.

The focal length of the micromirror array lens 140 is changed by controlling the translational motion and/or the rotational motion of the micromirrors. The rotational motion of the micromirror changes the direction of light, and the translational motion of the micromirror adjusts the phase of the light.

The variable focusing lens 140 must meet several requirements. First, it must have a focal length change speed fast enough for three-dimensional display. Second, it must have a large range of numerical aperture change, since the depth range that can be imaged depends on the range of numerical aperture change. Third, it needs to have a large diameter depending on constructions of the 3D displays.

The micromirror array lens meets those requirements, first, because the response speed of the micromirror exceeds 10 KHz. Therefore, it is possible to make the focal length change speed of the micromirror equal to or greater than 10 KHz.

Second, the range of numerical aperture change of the micromirror array lens is greater than that of any existing variable focusing lenses. Therefore, as explained above, the micromirror array lens has a greater range of image depths, which is an essential requirement for a 3D display. For example, when a 19 inch 3D TV is made with the micromirror array lens, it can display image depths from 1 m to infinity.

Third, in contrast with a lens having a continuous shape, for which it becomes difficult to make an ideal curved surface as the size becomes larger, there is no difficulty in enlarging the size of micromirror array lens, since the micromirror array lens consists of discrete micromirrors.

Since the micromirror array lens 140 is a reflective lens, the optical system of the three-dimensional display device 110 cannot be arranged in-line. An optical arrangement, in which the reflected light is not blocked by the 2D display, is required.

FIGS. 14(a)-14(d) illustrate the general principle regarding the distance or depth of an image formed by a lens, and the focal length of the lens. When light from an object passes through a lens, it converges or diverges depending on the distance L between the object and the lens, and the focal length of the lens. In the description of the present invention, a lens means an optical element that focuses light, and is not confined to a refractive type lens.

Figure 14A:
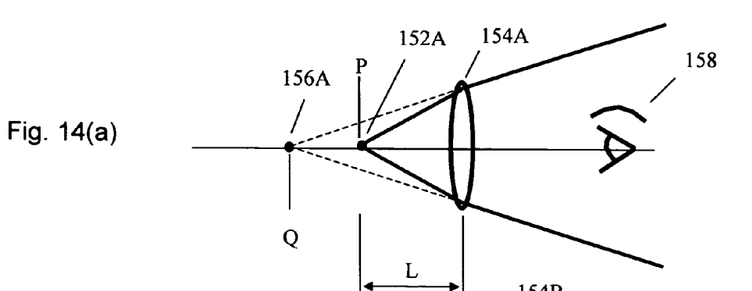
FIGS. 14(a)-14(d) are schematic side views illustrating the principle of how a human eye perceives real and virtual images.
Figure 14B:
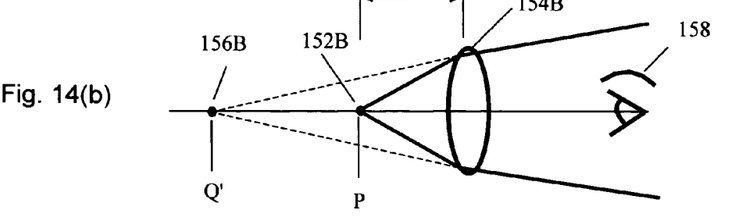

FIG. 14(a) shows that the light from an object 152A passes through a lens 154A and then diverges at a different angle. FIG. 14(b) is a similar diagram for a lens 154B having a shorter focal length. The light refracted by the lens 154A and 154B forms a virtual image 156A and 156B. When a viewer 158 sees the refracted light, the viewer perceives the object 152A and 152B, which is positioned at a point P, as existing at a virtual point Q and Q'.

Figure 14C:
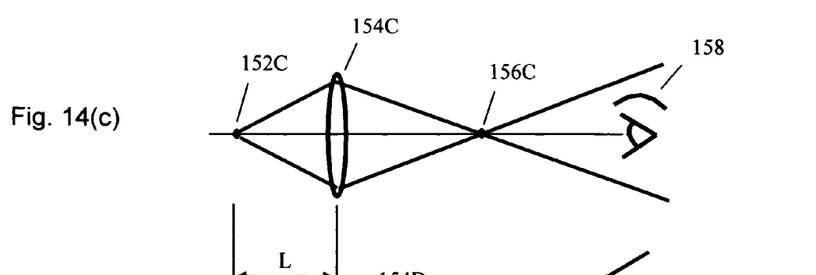
Figure 14D:
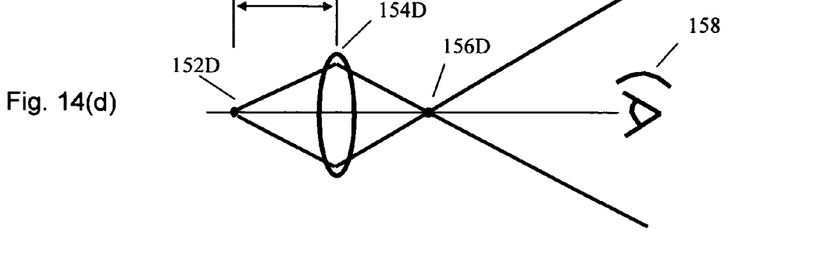

As shown in FIG. 14(c), the light from an object 152C passes through a lens 154C and then converges to form a real image 156C. FIG. 14(d) illustrates a similar lens 154D having a shorter focal length. When the viewer 158 sees an object 152C and 152D through the lens 154C and 154D, the viewer perceives the object as existing at points 156C and 156D.

For a given distance L between the object and the lens, the position of the image formed by the lens varies depending on the focal length of the lens. The position of the image can be calculated with Gauss' Lens Formula. FIGS. 14(a) and 14(b) show that the virtual image 156A is nearer to the viewer 158 with the lens 154A having a longer focal length, and the virtual image 156B is farther from the viewer 158 with the lens 154B having a shorter focal length. FIGS. 14(c) and 14(d) show that the real image 156C is nearer to the viewer 158 with the lens 154C having a longer focal length, and the real image 156D is farther from the viewer 158 with the lens 154D having a shorter focal length. Thus, the position of a virtual or real image changes according to the focal length of a lens, and the position of the image will change continuously as the focal length varies continuously.

Referring now to FIG. 9, a 3D image is generated in space by imaging depthwise 2D images on corresponding depths in space with the variable focusing lens. The 2D display 120 displays only pixels that should be imaged at the same depth at a given moment or a given frame. The variable focusing lens adjusts its focal length in order to image the depthwise image to the required location in space.

Figure 10A:
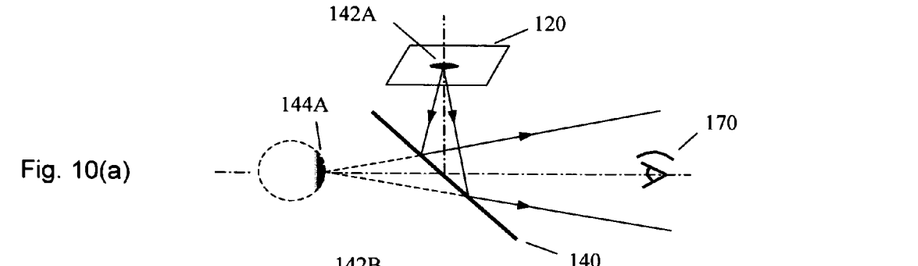
FIGS. 10(a)-10(c) are schematic side views illustrating how the display system of FIG. 9 displays an object as a three-dimensional spatial image according to principles of the present invention.
Figure 10B:
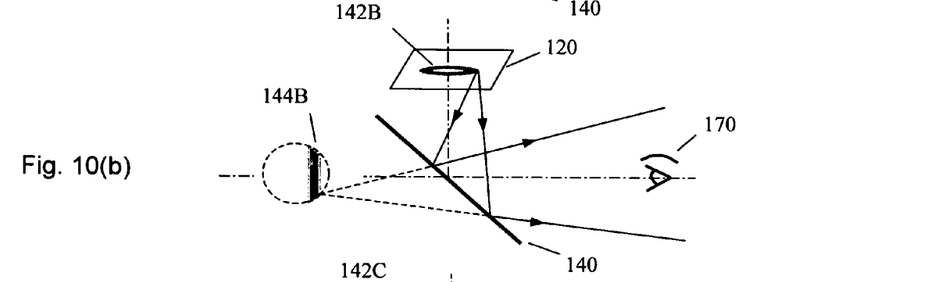
Figure 10C:
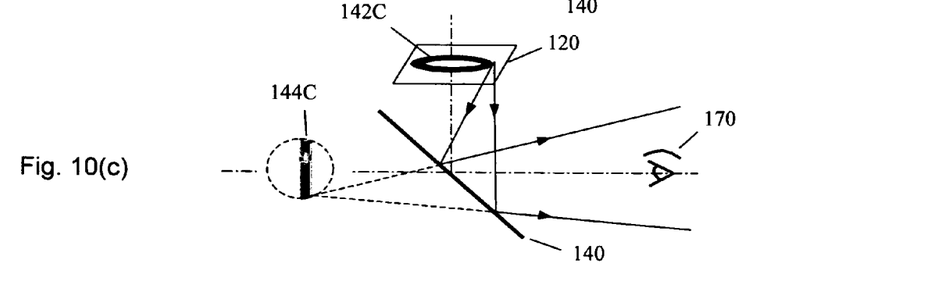

As shown in FIGS. 10(a)-10(c), the first image 112 includes a predetermined depth number of first depthwise images 142A, 142B, and 142C that are displayed within a unit time. The second image 160 includes corresponding second depthwise images 144A, 144B, and 144C. Each of the first depthwise images represents the portion of the first image having the same image depth. The 2D display 120 displays one first depthwise image at a time. The variable focusing lens reflects light from the 2D display, and the focal length of the variable focusing lens 140 changes according to the depth of the first depthwise image being displayed. The focusing speed of the variable focusing lens is at least equal to the product of the afterimage speed of the human eye and the depth number so that the second image looks three-dimensional to the viewer. The length of the unit time should be less than or equal to the afterimage speed of the human eye so that a series of the first images 112 look as a three-dimensional image to the viewer 170.

In order that the sequentially displayed second depthwise images 144 look as a three-dimensional second image 160 to the viewer 170, the second depthwise images must be displayed fast enough to utilize human eye's afterimage effect. That is, the variable focusing lens 140 must be able to change its focal length fast enough. For example, to display a 3D image, an afterimage speed of about 30 Hz is required. In order to display a three-dimensional image having 10 image depths, since the 10 depths must all be displayed within one thirtieth of a second, a variable focusing speed and 2D display speed of at least about 300 Hz (30×10 Hz) are required.

A three-dimensional image may be displayed using a virtual image, as illustrated in FIGS. 14(a) and 14(b), or a real image, as illustrated in FIGS. 14(c) and 14(d). The method of using a real image is advantageous because it enables more realistic display, since the image is generated closer to the viewer. The disadvantage to this method is that the range of display is limited between the viewer and a display screen.

With the method using a virtual image, the image is generated behind the display screen. This method has an advantage that it can display an image having depth ranging from the screen to the infinity.

Figure 16:
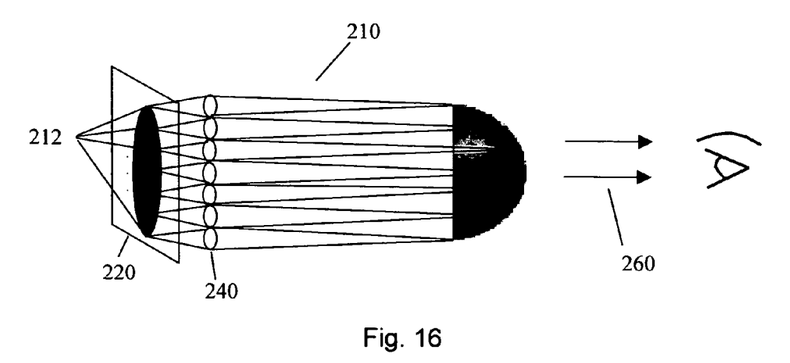
FIG. 16 is a schematic side view of a second alternative three-dimensional display system in accordance with the present invention.

In another embodiment, as shown in FIG. 16, the 3D display device 210 may comprise a plurality of variable focusing lenses 240 corresponding to pixels 212 of the 2D display 220, to display a three-dimensional image 270. The size of the variable focusing lens is preferably similar to that of the corresponding pixels. The partial image displayed by each pixel 212 is imaged at its image depth by the variable focusing lens corresponding to the pixel. Since the partial image displayed by each pixel is individually handled by the corresponding variable focusing lens, dividing an image into depthwise images and displaying the depthwise images are not required. Thus, this embodiment does not need a high speed 2D display and a high speed variable focusing lens. A 2D display having a usual speed can be used.

Figure 17:
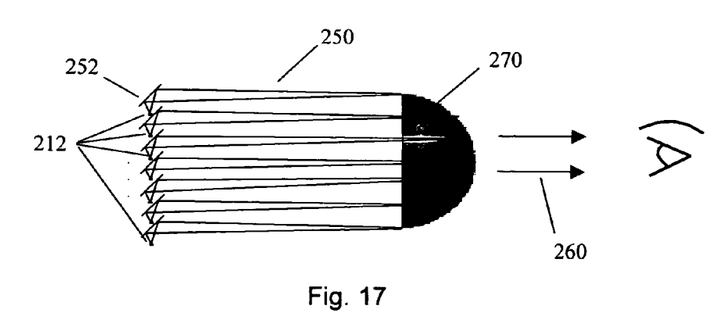
FIG. 17 is a schematic side view of a third alternative three-dimensional display system in accordance with the present invention.

FIG. 17 illustrates a third embodiment 3D display device 250. This 3D display device includes a 2D display (not shown) having a plurality of pixels 212, and a plurality of variable focusing lenses 252. The variable focusing lenses preferably comprise micromirror array lenses. Each variable focusing lens 252 corresponds to one of the pixels 212. The focusing speed of the variable focusing lens is at least equal to the afterimage speed of the human eye, and each of the variable focusing lenses reflect light from the two-dimensional display. The focal length of the variable focusing lenses are changed according to the image depth of an image displayed by each pixel.

Since the micromirror array lens is a reflective optical element, the lens element 252 must be positioned so that the reflected light is not blocked by the 2D display. Each pixel 212 displays a portion of a first image in a direction orthogonal with the device display direction 260 of the 3D display device 250. The lens elements 252 are positioned at an angle of 45° with respect to the display direction of the pixels and the device display direction 260. A second image 270, which is three-dimensional, is formed by the lens elements. Notwithstanding this complex arrangement, micromirror array lens is used because its range of numerical aperture change is large.

Figure 18:
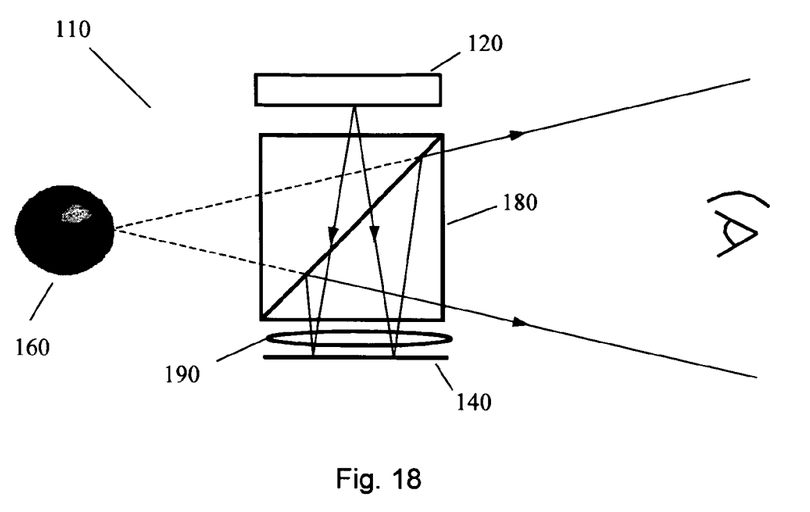
FIG. 18 is a schematic side view of a fourth alternative three-dimensional display system in accordance with the present invention.

In the alternative embodiment shown in FIG. 18, the 3D display device 110 further includes a beam splitter 180 positioned in the path of light between the 2D display 120 and the variable focusing lens 140. The 2D display and the variable focusing lens are arranged parallel with each other. The beam splitter changes the direction of the light by 90°, and thus simulates an in-line optical arrangement. The micromirror array lens 140 is positioned orthogonal to the light path.

Alternatively, referring back to FIG. 9, the variable focusing lens 140 may be positioned so that the path of the light reflected by the variable focusing lens is not blocked by the two-dimensional display 120. The arrangement in FIG. 9 has the advantages of simple structure and wider field of view since the distance between the 2D display and the variable focusing lens is closer than that of the arrangement with a beam splitter. However, it has a disadvantage of reduced image quality due to aberration induced by the obliquely positioned variable focusing lens. The choice of either arrangement depends on the use of the display device.

Figure 15:
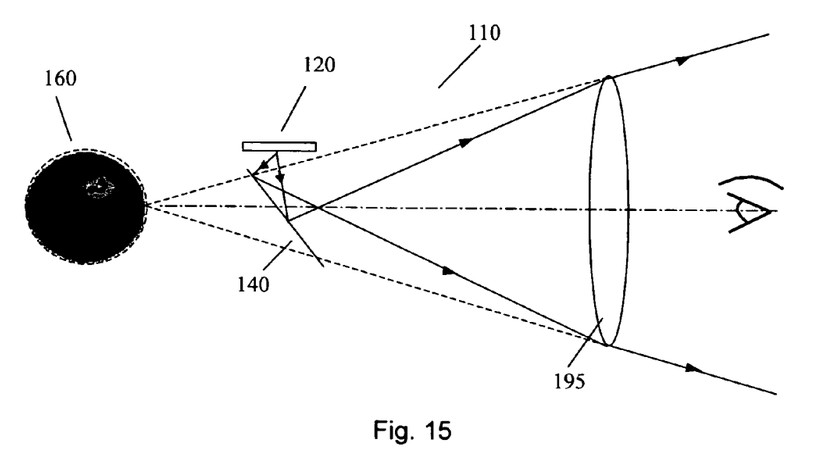
FIG. 15 is a schematic side view of an alternative three-dimensional display system in accordance with the present invention.

As shown in FIG. 15, the 3D display device 110 may further include an auxiliary lens 195 having a predetermined focal length and positioned adjacent to the variable focusing lens 140. The auxiliary lens may be a refractive type Fresnel lens. The second image 160 is formed by the effective focal length of the variable focusing lens and the auxiliary lens. With the auxiliary lens, the variable focusing range of the 3D display device can be extended or changed to a desired range.

In embodiments wherein the three-dimensional object 160 is displayed through an optical display screen (3D display screen), the size of the variable focusing lens 140 should correspond with the size of the 3D display screen. For a device having a large display screen, such as a 60 inch display screen, it is almost impossible or extremely expensive to make a variable focusing lens having a size as large as that of the display screen. Accordingly, the 3D display device 110 may further include an auxiliary lens 195 that magnifies the second image 160, in order to overcome this limitation. The auxiliary lens may be an ordinary refractive lens or a refractive Fresnel lens. The size of the display screen becomes the size of the auxiliary lens 195, which has a fixed focal length. A 2D display 120 and a variable focusing lens 140 have a compact size that is much smaller than the size of the auxiliary lens 195. The effective focal length of the 3D display device 110 is varied by changing the focal length of the variable focusing lens.

Further, the focal length of the variable focusing lens 140 may be fixed. By fixing the focal length of the variable focusing length and operating the 2D display as a general 2D display device, the 3D display device 110 can be easily converted into a 2D display device.

FIG. 1 illustrates how a broadcasting system 20 in accordance with the present invention broadcasts three-dimensional images. First, an object 25 is scanned by the imaging system 30 to capture a set of two-dimensional image frames of the object. The imaging device 32 focuses on various planes of the object and receives an image by the image unit or sensor 60. The focal plane of the imaging device is changed by the variable focusing system 34. The speed of focal length change of the focusing system determines the depth resolution of 3D image.

In the captured image, only the pixels corresponding to the focused depth are in-focus and the other pixels in the image sensor are blurred. The corresponding focal plane of the variable focusing system becomes the depth data of the in-focused pixel. The set of image frames are captured within the afterimage time of human eye.

After a set of two-dimensional image frames are captured by the imaging device, the image processor 80 extracts the in-focused pixels of each image, records the corresponding colors, intensities, and depth data of extracted pixels, and finally constructs an all-in-focused image and a depth profile of each pixels. The final output of image process 3 is a two-dimensional all-in-focused image 82 and a depth profile 84 of an all-in-focused image.

Compared with the output of conventional two-dimensional broadcasting camera, the all-in-focused image is fully matched in data format. The depth information is only added to the two-dimensional all-in-focused image data to generate the three-dimensional imaging.

To get real-time three-dimensional video images, the desired focal planes of the object are scanned within a unit time less than the afterimage time of the human eye. In that regard, the focal length of the focusing system 34 must be changed at a rate equal to the desired number of focal planes times the afterimage speed of the human eye, and the image processing speed must be equal to or larger than the speed of the focusing system 34.

The viewing angle of a single imaging device, or camera is limited, therefore two or more imaging devices can be used to increase the viewing angle for 3D images. Multiple image devices are presently used in existing 3D imaging methods such as the lenticular method and/or parallax method, previously mentioned above. Two or more sets of two-dimensional images or all-in-focused images captured synchronously by different imaging devices with different angles of view, can be processed simultaneously to construct an integrated all-in-focused image by the image processor.

Once the image data is processed and stored, a data signal carrying the image data is generated by the transmitter 91 and transmitted via the transmission system 90. The image data may be transmitted with conventional two-dimensional broadcasting systems, cable systems, and/or alternative transmission systems. Since the all-in-focused image data has the same format and size as conventional two-dimensional video data, the all-in-focused image data can be transmitted by conventional methods and standards. The depth profile, which is used for restoring the three-dimensional image, can be carried on the vacant space in the transmission channel that is not occupied by the video and/or audio signal data.

To provide two-dimensional and/or three-dimensional image information to viewers, little or no modification is required for conventional two-dimensional television broadcasting system, cable systems, and/or alternative transmission system. Further, rearrangement of the radio channel spacing and/or reallocation of the radio channel are not required because the conventional radio bandwidth of a commercial television broadcasting system is enough to transmit data of the invented three-dimensional system.

Once the data signal is received by the receiver 94, the all-in-focused image and depth profile is processed by the display system's 100 signal processor. The signal processor then extracts depth information for pixels from a depth profile, and the corresponding all-in-focused image is displayed on the internal 2D display. When an image with the same depth is displayed on the internal 2D display, the image is imaged in space by the variable focusing system. By changing the focal plane of the variable focusing system, the image is restored at the desired depth in space and viewers feel the depth of the image. This subsequent process generates a series of depthwise images at different depths in space. And a complete three-dimensional image is formed within the afterimage time of human eye.

Viewers who have three-dimensional display devices 98 can view the object as a three-dimensional spatial image. The three-dimensional display device can also display qualitatively enhanced all-in-focused two-dimensional images if the focal plane is not changed.

In order to display the series of depthwise images with different depths within the afterimage time of human eye, the frequency of focal length change of the focusing system must be larger than the product of the afterimage speed of human eye and the number of two-dimensional depthwise images in an all-in-focused image. The variable focal length lenses of prior art can not be used for three-dimensional display devices in the present invention because their speed of focal length change is less than 100 Hz. Only micromirror array lens can satisfy the required speed of focal length change.

Viewers who have conventional two-dimensional display devices 96, such as conventional TV sets and digital displays, can watch two-dimensional images using their devices. In the case, depth information is discarded automatically. Even though viewers can not watch three-dimensional image, the present invention is beneficial to conventional two-dimensional display device holders because the image is all-in-focused, and the viewer can watch enhanced two-dimensional images with their conventional devices.

The preceding description has been presented with reference to presently preferred embodiments of the invention. Workers skilled in the art and technology to which this invention pertains will appreciate that alterations and changes in the described structure may be practiced without meaningfully departing from the principal, spirit and scope of the invention.

Accordingly, the foregoing description should not be read as pertaining only to the precise structures described and illustrated in the accompanying drawings, but rather should be read consistent with and as support to the following claims which are to have their fullest and fair scope.

What is claimed is:

1. A three-dimensional television broadcasting system comprising:
    a three-dimensional imaging system, wherein the imaging system generates a three-dimensional image data comprising two-dimensional all-in-focused image and depth information;
    an audio/visual signal transmission system, wherein the transmission system transmits a data signal carrying the three-dimensional image data comprising two-dimensional all-in-focused image and depth information; and
    a displaying system, wherein the displaying system is a three-dimensional display device having at least one micromirror array lens comprising a plurality of micromirrors, wherein a focal length of the micromirror array lens is changed by controlling rotation and translation of the micromirrors;
    wherein the displaying system receives the transmitted data signal and restores the three-dimensional image data as a three-dimensional image by changing the focal length of the micromirror array lens.

2. The three-dimensional television broadcasting system of claim 1, wherein the signal transmission system is compatible with conventional commercial two-dimensional broadcasting systems, cable systems and/or other alternative methods.

3. The three-dimensional television broadcasting system of claim 1, wherein the imaging device includes at least one micromirror array lane comprising a plurality of micromirrors, wherein a focal length of the micromirror array lens is changed by controlling rotation and translation of the micromirror, wherein the three-dimensional image data is generated by changing the focal length of the micromirror array lens.

4. The three-dimensional television broadcasting system of claim 1, wherein the variable focusing system further comprises a conventional zoom lens system.

5. The three-dimensional television broadcasting system of claim 1, wherein the imaging device includes an image processor that generates three-dimensional image data comprising a two-dimensional all-in-focused image and depth profile.

6. The three-dimensional television broadcasting system of claim 5, wherein the all-in-focused image and depth profile are created from a set of two-dimensional image frames having different focal planes and/or different angles of view.

7. The three-dimensional television broadcasting system of claim 5, wherein the all-in-focused image is used to improve image quality of a conventional two-dimensional broadcasting system.

8. The three-dimensional television broadcasting system of claim 5, wherein the all-in-focused image is constructed from plural sets of images which are captured at different angle of view but captured synchronously.

9. The three-dimensional television broadcasting system of claim 5, wherein the all-in-focused image and the depth profile are created from computer generated images.

10. The three-dimensional television broadcasting system of claim 5, wherein the all-in-focused image and the depth profile are created by combining two or more sets of captured images and computer generated images.

11. The three-dimensional television broadcasting system of claim 5, wherein the three-dimensional image data is transmitted using a conventional two-dimensional commercial television broadcasting system.

12. The three-dimensional television broadcasting system of claim 11, wherein the depth profile is carried on the vacant space in the data signal that is not occupied by video/audio data.

13. The three-dimensional television broadcasting system of claim 1, wherein the displaying systems restores a three-dimensional image using the two-dimensional all-in-focused image and the depth profile.

14. The three-dimensional television broadcasting system of claim 1, wherein the three-dimensional display device displays qualitatively enhanced two-dimensional images.

15. The three-dimensional television broadcasting system of claim 1, wherein the all-in-focused image is synthesised from two or more two-dimensional images having different focal planes and/or different angles of view.

16. The three-dimensional television broadcasting system of claim 1, wherein the all-in-focused image and depth profile are created from computer generated images.

17. The three-dimensional television broadcasting system of claim 1, wherein the all-in-focused image is constructed by combining two or more sets of captured images and computer generated images.

18. The three-dimensional television broadcasting system of claim 1, wherein the displaying system further comprises a signal processor that extracts pixels of the depthwise images and the corresponding depth information from the all-in-focused image and the depth profile.

19. A method for broadcasting three-dimensional images by using a micromirror array lens, comprising:
    capturing a set of two-dimensional image frames of an object with an imaging system;
    processing the set of two-dimensional image frames to generate corresponding three-dimensional image data comprising all-in-focused image and depth information;
    transmitting a data signal carrying the three-dimensional image data comprising all-in-focused image and depth information over a television broadcasting system;
    receiving the image data by a displaying system;
    extracting and restoring the image data in the displaying system; and
    broadcasting the object on the displaying system as a three-dimensional spatial image by changing a focal length of at least one micromirror array lens.

20. The method of claim 19, wherein the television broadcasting system is compatible with conventional commercial two-dimensional broadcasting systems, cable systems and/or other alternative methods.

21. The method of claim 19, wherein the sat of two-dimensional image frames are captured with a unit time of less than or equal to the afterimage of the human eye.

22. The method of claim 19, wherein the imaging system comprises an imaging device having a micromirror array lens comprising a plurality of micromirrors, wherein a focal length of the micromirror array lens is changed by controlling rotation and translation of the micromirrors, wherein the three-dimensional image data is generated by changing the focal length of the micromirror array lens.

23. The method of claim 19, wherein the three-dimensional image data comprise a two-dimensional all-in-focused image and depth profile.

24. The method of claim 23, wherein the two-dimensional all-in-focused image and depth profile is created from a set of two-dimensional image frames having different focal planes and/or different angles of view.

25. The method of claim 23, wherein the all-in-focused image is constructed from a synchronised set of two-dimensional image frames captured at different angles of view.

26. The method of claim 23, wherein the all-in-focused image and the depth profile are created from computer generated images.

27. The method of claim 23, wherein the all-in-focused image and the depth profile are created by combining two or more sets of captured images and computer generated images.

28. The method of claim 23, wherein the depth profile is carried on the vacant space in the transmitted data signal that is not occupied by video/audio data.

29. The method of claim 23, wherein the three-dimensional image is restored by using the two-dimensional all-in-focused image and the depth profile.

30. A three-dimensional television broadcasting system comprising:
  a three-dimensional imaging system having at least one micromirror array lens comprising a plurality of micromirrors, wherein a focal length of the micromirror array lens is changed by controlling rotation and translation of the micromirror, wherein the imaging system generates a three-dimensional image data comprising two-dimensional all-in-focused image and depth information by changing the focal length of the micromirror array lens;
  an audio/visual signal transmission system, wherein the transmission system transmits a data signal carrying the three-dimensional image data comprising two-dimensional all-in-focused image and depth information; and
  a displaying system comprising a conventional two-dimensional display apparatus and using all-in-focused image data to display qualitatively enhanced two-dimensional images;
wherein the displaying system receives the transmitted data signal and restores the image data as an image.

31. A method for broadcasting three-dimensional images by using a micromirror array lens, comprising:
  capturing a set of two-dimensional image frames of an object with an imaging system, wherein the imaging system has at least one micromirror array lens comprising a plurality of micromirrors, wherein a focal length of the micromirror array lens is changed by controlling rotation and translation of the micromirrors, wherein the two-dimensional image frames are captured by changing the focal length of the micromirror array lens;
  processing the set of two-dimensional image frames to generate corresponding three-dimensional image data comprising all-in-focused image and depth information;
  transmitting a data signal carrying the three-dimensional image data comprising all-in-focused image and depth information over a television broadcasting system;
  receiving the image data by a conventional two-dimensional display apparatus;
  extracting and restoring the image data in the displaying system; and
  broadcasting the object on the conventional two-dimensional display apparatus by using the all-in-focused image data to display qualitatively enhanced two-dimensional images.

* * * * *